Oct. 22, 1929.  G. C. THOMAS, JR  1,732,956

CABLE CONNECTER

Filed July 26, 1926

INVENTOR
George C. Thomas, Jr.
BY
Dohleber Ledbetter
ATTORNEYS

Patented Oct. 22, 1929

1,732,956

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,818.

This invention relates to cable box and connecting means, and more particularly to improved connecters for attaching cable to electric fixture boxes and the like.

An object of the invention is to produce an improved cable connecter of the type which leaves exposed a part of the box hole edge and which is capable of anchoring itself and a cable to the box hole edge without screw fastening means directly connected with or extended through the box; and to include therewith an improved cable bearing clamp plate as an integral part of the connecter.

A further object of the invention is to produce a cable connecter of single piece structure capable of performing three essential functions, namely, that of anchoring itself in a box hole, that of protecting the cable from a screw, and that of bushing the wire at the end of the ragged cable.

Another object is to produce a connecter of U-shaped form which comprises a combination one piece cable and box clamp including two clamp arms, one of which anchors itself to the box edge and the other grips against a cable, a single operating means being employed to perform both functions.

Other objects of the invention are set forth in the specification describing an example of the invention.

The accompanying drawings show an example of the invention serving to explain its principle, construction, and mode of application to an electric fixture box.

The first two figures are cluster views of the connecter plate stamping, Figure 1 being a plan and edge view of the flat plate stamping. Figure 2 shows the three projections of the connecter plate bent upon itself to form parallel portions.

Figure 7 shows a clamp plate carrying an integral bushing designed to reach through a box hole and bush and protect the wire.

Figure 1:
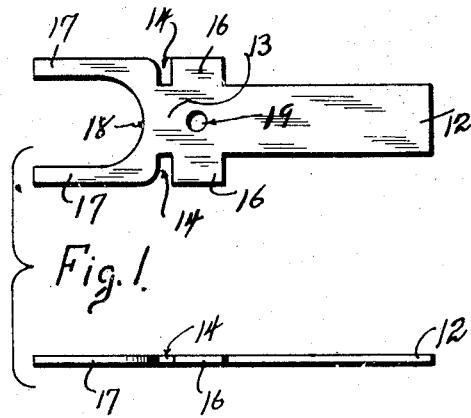

Electric fixture boxes B are made with cable and connecter receiving knock-out openings or holes H into which a cable C is received and attached to the box by use of a cable connecter, and this invention relates to improvements in connecting means for the foregoing purposes.

Coming now to a description of the connecter itself there is shown in the first two views a connecter plate blanked or stamped of sheet metal and folded upon itself in final form. The connecter plate comprises a comparatively long narrow stamping having a newly combined box hole anchorage means and bearing clamp means integral therewith both of which means are actuated by a single operating means to seat the anchorage means against the box hole edge and to simultaneously grip the cable against the exposed box hole edge.

The connecter plate comprises an end part forming a bearing clamp plate which I may call a cable clamp 12 extending from a box wall anchorage end 13 which is provided with spaced means to overlap the box hole edge, said means being in the form of box hole anchorage notches 14 defined by an inside box wall abutment 17 and outside abutments 16. The box hole edge anchorage notches 14 are made in alignment transversely of the longitudinal axis of the narrow connecter plate 13. The end member 17 defines a cable passage 18 through which the cable C passes when and if necessary the member 17 is employed. A screw threaded hole 19 is made in the connecter plate 13 adjacent the box hole edge notches 14. The abutment fork or U-shaped portion 17 is bent at right angles to the connecter plate 13 so as to define one edge of the aligned notches 14.

Figure 2:
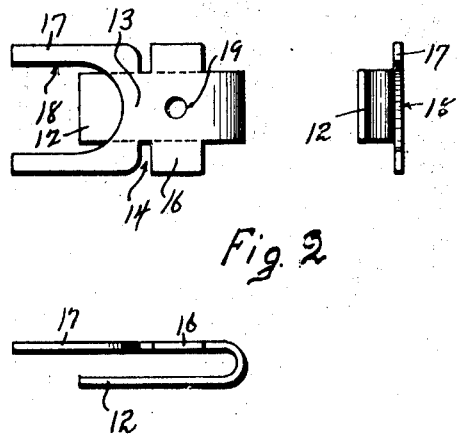
Figure 3:
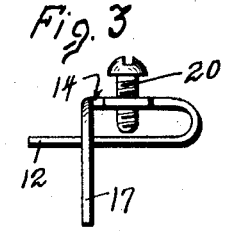
Figures 3, 4 and 5 illustrate a side elevation, inner end elevation, and a plan view of the finished connecter with the screw mounted thereon.
Figure 4:
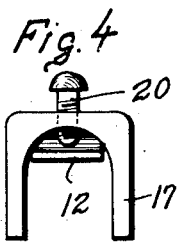
Figure 5:
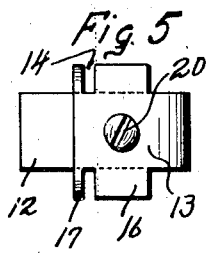
Figure 6:
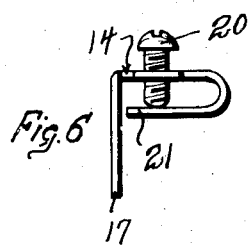
Figures 6 and 7 illustrate a modified form of the invention in respect to the cable clamp, Figure 6 being a connecter carrying an integral cable clamp of substantially short length to merely reach under the screw.

As observed in Figure 2 the connecter plate 13 is subjected to a bending operation so that the cable clamp end 12 is folded upon the connecter plate 13 so as to cause the end 12 to reach in parallel relation back towards the notches 18. The length of the cable clamp end 12 is optional and assumes various forms. Observe for example Figure 6 where the end 12 for particular kinds of work may be made relatively short and just long enough to come under the end of a screw 20 employed as operating means by which the connecter anchors itself in a box hole and simultaneously grips the cable against the exposed box hole edge. On the other hand the cable clamp end 12 may be sufficiently long to extend beyond the box hole edge anchorage notches 14 and may even project through the cable passage 18 and beyond the box wall abutment 17 if desired.

The connecter plate 13 is made suitable in size to enable it to fit into a box hole H so as to register the notches 14 with the box wall and at the same time expose a part of box hole edge to the cable C introduced into the box hole. The size of the end 13 may therefore advisably be made slightly narrower than the diameter of the box hole H. At least one end of the connecter plate on one side or the other, of the anchorage notches 14 or spaced abutment means, should be made small enough to permit the connecter plate to be inserted in the box hole. In fact the connecter plate is shown as relatively long and narrow to reduce the amount of metal therein and to enable it to fit into the box from either side.

In the use of the connecter, the screw 20 is backed out or partly unscrewed from the connecter plate 13 so as to permit the cable bearing clamp plate 12 to flex toward the connecter body 13 whereupon the notches 14 are placed in registry with the box hole edge H and the cable C is introduced into the box hole beside the cable clamp 12. The screw 20 is now run down and bears the cable clamp 12 forcibly against the cable C which is forced laterally with respect to the box hole axis and is gripped against the exposed box hole edge. The reaction of the screw against the cable clamp and cable causes the notches 14 to press outwardly away from the axis of the box hole and thus become positively and firmly seated against the box hole edge thereby anchoring the connecter in the box hole against longitudinal displacement. One only operating means, the screw, serves two main purposes by attaching the cable to the box and fastening the connecter in the box.

The bearing clamp plate 12 is subject to several variations in form as already suggested and in this connection I will explain that the cable clamp 12 serves to transfer the pressure of the screw 20 to a point in alignment with the box wall so that the force of the screw is applied substantially parallel to the box wall. In this way, the pressure developed by the cable connecter does not bear unevenly on the cable to make it stand at an angle to the box wall but the pressure of the screw is transferred to the exposed box hole edge by the cable clamp to bear evenly on the cable directly over and in line with the box hole edge.

Figure 7:
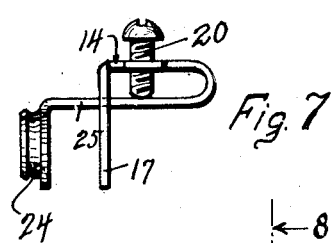
Figure 8:
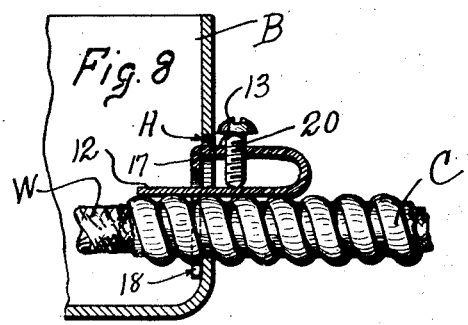
Figure 8 shows a general box assembly view with the connecter mounted in the box hole anchoring a cable therein.
Figure 9:
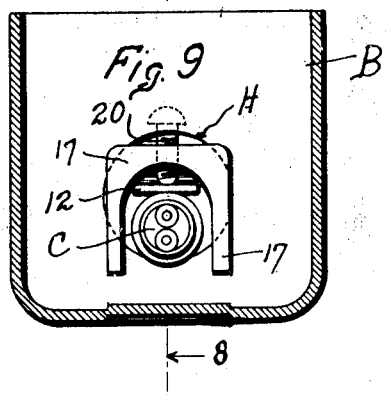
Figure 9 shows an inside view of the connecter and cable anchored in the box.
Figure 10:
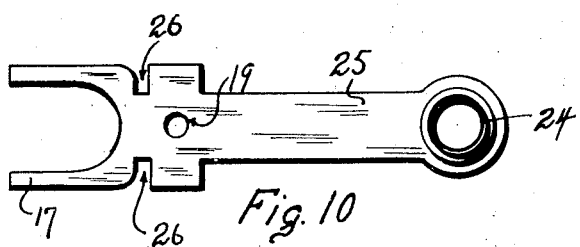
Figure 10 is a view of the stamping employed in producing the connecter shown in Figure 7.

A further improvement in the connecter is shown in Figures 7 and 10, the latter view being the stamped and drawn connecter plate showing a bushing 24 made on the outer free end of the cable clamp plate 25, while the former view is the completed connecter. The cable clamp plate 25 is bent at right angles adjacent the bushing 24 so as to make the axis of the bushing hole about parallel to the plate 25 and thus the bushing 24 extends at right angles to the plate 25 when the connecter plate is folded upon itself in ultimate form shown in Figure 7. Thus the bushing 24 stands in spaced relation beyond the box hole wall inside the box with the anchorage notches 26 overlapping the hole edge and the connecter is thus mounted in the box with a bushing to guide, support, and protect the wires extending from the ragged end of a cable C. The bushing 24 also acts as a stop against which the cable armor rests to limit the distance the cable projects into the box.

An advantage of this connecter resides in the fact that it is made in one piece, that it enables cable to be secured to the box hole edge rather than to the connecter itself; and furthermore, the foregoing is accomplished by the use of one operating means to simultaneously perform two purposes, namely, that of gripping the cable against the box hole edge and positively seating the spaced abutments or notches against the box hole edge. Also, the bearing clamp plate of the connecter serves two purposes, namely, that of flexibly carrying the bushing and that of bearing against the cable to protect it from the end of the screw.

What I claim is:—

1. A cable and box connecter comprising a connecter plate having a portion less in width than the diameter of a box hole and of suitable size to fit into the hole and formed to expose a part of a box hole edge directly to a cable, anchorage means on the connecter plate by which it is fastened in the box hole, a cable clamp plate included integrally on the connecter plate and formed by bending the connecter plate back on itself to produce a connecter having substantially parallel integral portions one of which extends into the box hole and includes the anchorage means aforesaid, said cable clamp being sufficiently long to extend its end past the anchorage means and reach through the box hole, a bushing included on the end of the cable clamp and said bushing being spaced from a box wall, and operating means mounted on the connecter to forcibly move the two portions apart to fasten one portion against a box hole edge and simultaneously press the other portion against the cable to grip it against an exposed box hole edge.

2. A cable and box connecter comprising a connecter plate of suitable size to fit into a box hole and formed to expose a part of a box hole edge directly to a cable, anchorage notches on the connecter plate by which it is fastened in a box hole, an abutment with a cable passage included at right angles on the plate adjacent to and defining one edge of the notches and resting in contact with a box wall, a cable clamp plate included integrally on the connecter plate and formed by bending the connecter plate back on itself and said cable clamp plate extending through the box hole and through the cable passage, and operating means mounted on the connecter to seat the anchorage notches against the box hole edge and bear a cable clamp plate against the cable.

3. A cable connecter comprising a flat connecter plate of less width than the diameter of a box hole into which it is adapted to be placed, including box hole edge anchorage means proximate one end, the other end being bent back alongside the connecter plate to form a cable clamp plate and operating means on the connecter to force the connecter plate in one direction and the cable clamp plate in the other direction.

4. A cable connecter comprising a flat connecter plate of less width than the diameter of a box hole into which it is adapted to be placed, including box hole edge anchorage means proximate one end, the other end being bent back alongside the connecter plate to form a cable clamp plate, said cable clamp plate being long enough to extend beyond the anchorage means, a wire bushing included on the end of the cable clamp plate, and operating means on the connecter to force the connecter plate in one direction and the cable clamp in the other direction.

5. A cable connecter comprising a flat connecter plate of less width than the diameter of a box hole into which it is adapted to be placed, including box hole edge anchorage means at one end, the other end being bent back alongside the connecter plate to form a cable clamp plate, and a screw threaded through the connecter bearing against the cable clamp plate to force the connecter plate in one direction to operate the anchorage means and to force the cable clamp in the other direction to grip a cable.

6. A connecter comprising a strip bent upon its self to form parallel portions of unequal length, anchorage means formed on the end of the shorter portion to engage a box hole edge, the end of the shorter portion being bent at right angles at the anchorage means to form a box wall abutment and including a cable passage through which flexibly passes the longer portion, a bushing carried on the longer portion at its end beyond the abutment, and a screw threaded through the shorter portion to bear on the longer portion to bear the latter against a cable and to render effective the anchorage means.

In testimony whereof I affix my signature.

GEORGE C. THOMAS, Jr.